United States Patent [19]

Dvorachek

[11] 4,238,096

[45] Dec. 9, 1980

[54] MOVABLE SUPPORT POST DEVICES

[75] Inventor: Harold A. Dvorachek, Iola, Kans.

[73] Assignee: The Echlin Manufacturing Company, Branford, Conn.

[21] Appl. No.: 18,996

[22] Filed: Mar. 9, 1979

[51] Int. Cl.³ ............................................... A62C 23/04
[52] U.S. Cl. ..................................... 248/75; 248/160
[58] Field of Search ..................... 248/75, 160, 475 B, 248/600; 280/762; 404/11

[56] References Cited

U.S. PATENT DOCUMENTS

| | | | |
|---|---|---|---|
| 1,435,363 | 11/1922 | Wood | 248/160 X |
| 1,681,026 | 8/1928 | Bradnack | 248/160 |
| 1,771,817 | 7/1930 | Ragsdale | 248/160 X |
| 2,098,388 | 11/1937 | Hruska | 248/160 X |
| 2,103,410 | 12/1937 | Frei | 248/160 X |
| 2,397,151 | 3/1946 | Mitchell | 280/762 X |
| 2,978,217 | 4/1961 | Gunderson | 248/75 |
| 2,984,445 | 5/1961 | Dobrikin | 248/160 UX |
| 2,986,364 | 5/1961 | Vestal | 248/160 X |
| 3,193,230 | 7/1965 | Crankshaw | 248/160 |
| 3,442,187 | 5/1969 | Hausegger | 404/11 |

FOREIGN PATENT DOCUMENTS 2544837 4/1976 Fed. Rep. of Germany ....... 248/475 B
1014601 12/1965 United Kingdom .

*Primary Examiner*—J. Franklin Foss
*Attorney, Agent, or Firm*—Neuman, Williams, Anderson & Olson

[57] ABSTRACT

Movable support post devices are provided in which portions of flexible hose or cable members are supported from the upper end of a post structure including an elongated sleeve and a foot member which has a smaller diameter portion crimped on the lower end of the sleeve and a larger diameter portion defining a fulcrum edge which is engaged with a base member. In one embodiment a coiled tension spring is disposed within the sleeve with its upper end being connected to the sleeve and with its lower end being connected through a link to a base member, the link serving to minimize binding actions and stresses. In another embodiment, a coiled compression spring is disposed within the sleeve, the lower end of the spring being retained by a washer at the crimped end of the sleeve and the upper end of the spring being coupled to a retainer key and to the upper end of a tension rod, the lower end of which is hooked to the base member. In still another embodiment, using a compression spring and tension rod, the lower end of the tension rod is connected to the base member through a link.

15 Claims, 8 Drawing Figures

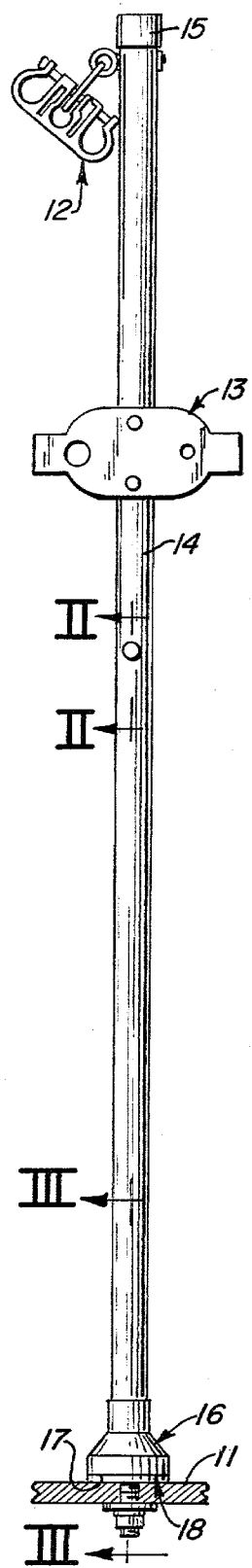
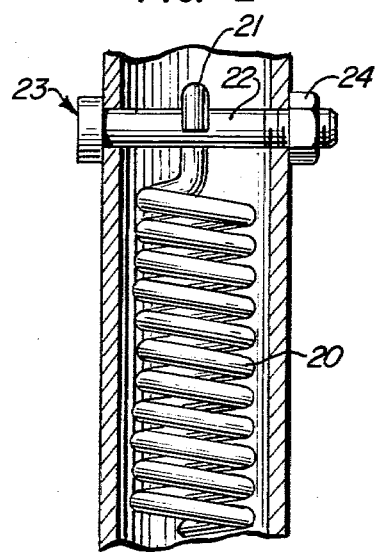
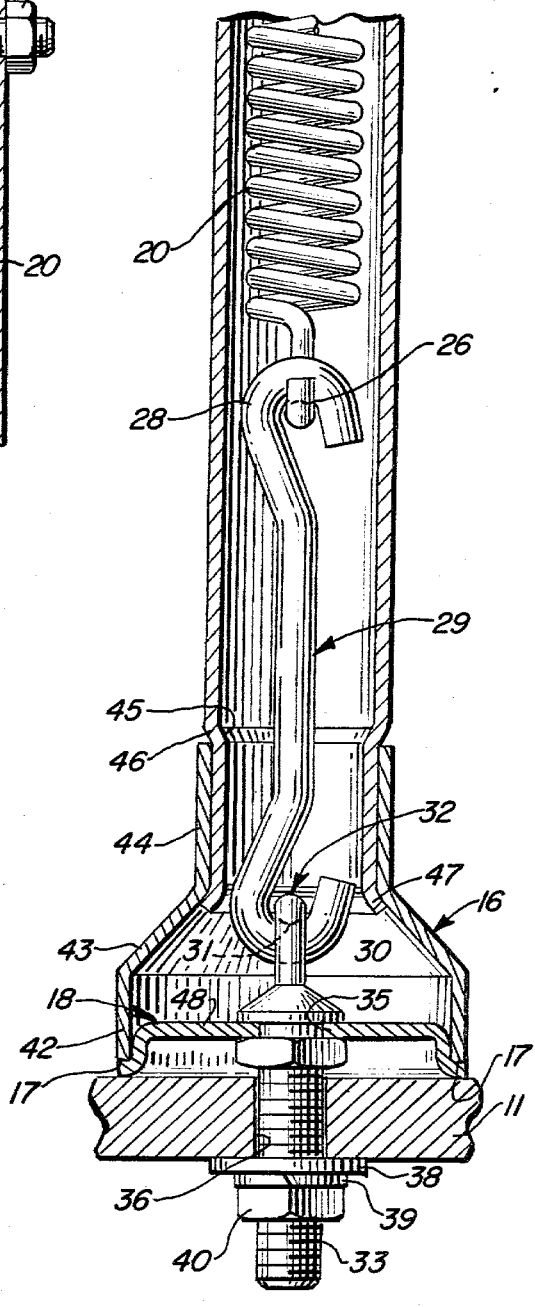

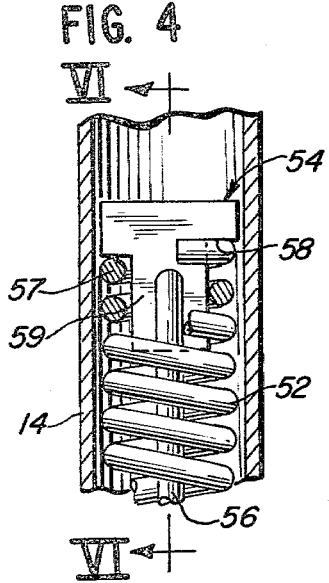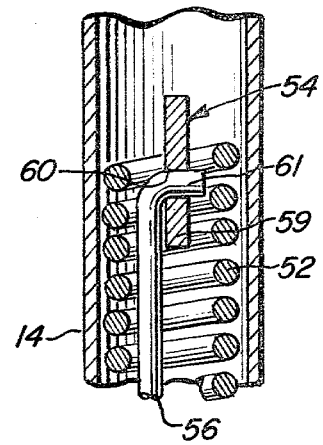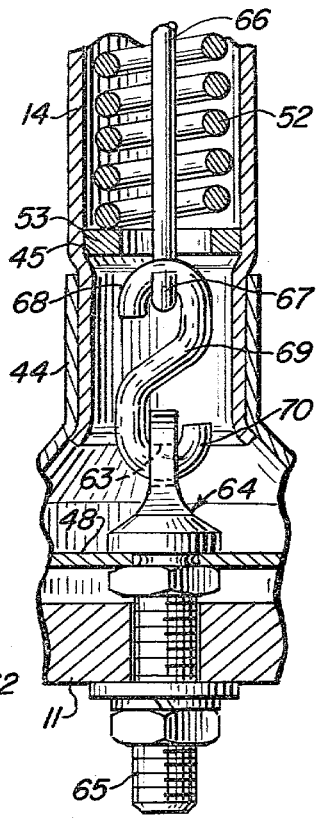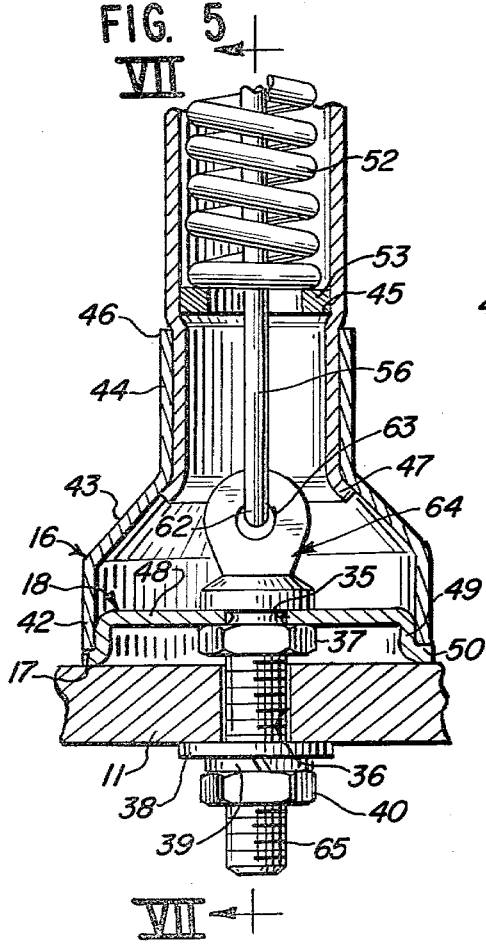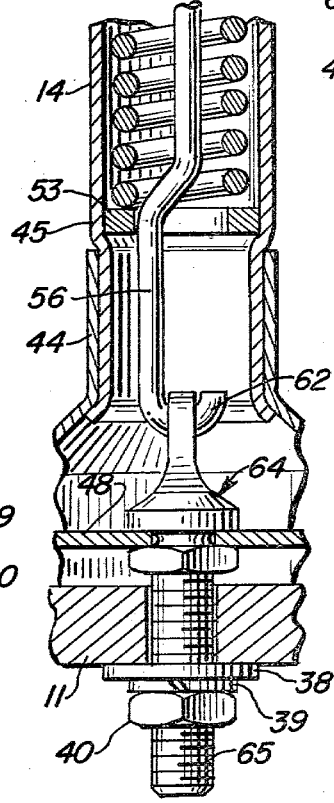

MOVABLE SUPPORT POST DEVICES

This invention relates to movable support post devices and more particularly to devices for use in supporting portions of flexible hose or cable members between truck tractor and trailers or for similar types of applications. The post devices are relatively simple in construction and are economical in the use of material and are otherwise economically manufacturable. At the same time, they provide optimum support characteristics, and they are very rugged, reliable and safe in operation.

BACKGROUND OF THE INVENTION

The length of hoses and electrical cables between a truck tractor and an associated trailer connected thereto must be such as to allow the tractor to be positioned at a sharp angle to the trailer, as when parking a trailer. The length is thereby such that if not supported, the hoses and cables would sag low enough in normal highway operation to be damaged by or to cause damage to underlying mechanical components. For this reason, it is desirable that intermediate portions of the hoses and cables be supported.

It is also desirable that swinging movements of the hose or cables or minimized. This is especially true for oscillatory movements which might build up to a large amplitude in response to rhythmic forces developed during operation at certain speeds or over certain highways. Such movements and the attendant continual flexing and rubbing of the lines, cables and support mechanism can lead to excess wear and fatigue failure.

In the prior art, there are various support devices which have heretofore been disclosed. One type is a cab-mounted support, such as illustrated in Dobrikin U.S. Pat. No. 2,948,450. It comprises a bracket assembly mounted on the rear upper surface of the cab having a spring-loaded slidable and swivelable arm extending over the space between the tractor and trailer. The flexible hose elements may be supported from the arm by spring means. While quite functionable, this type must be secured to the thin metal shell of the cab, an undesirable feature for certain purposes. It may also suffer from proneness to the aforementioned oscillation problem, particularly when the hoses and cables are suspended from the support arm by springs.

Another type, which has received considerable acceptance, is the support post type. In this type the hoses and cables are suspended from the upper portion or intermediate portion of an upstanding post on the tractor frame.

In one embodiment of the support post type the lower end of a vertical post member is secured to the upper end of an upstanding coiled spring. The lower end of the spring is secured to a supporting structure. This construction is relatively inexpensive. It suffers, however, from a tendency to built-up oscillatory movements under certain circumstances and related fatigue-failure problems.

Another embodiment of the support post type is illustrated, for example, in Dobriken U.S. Pat. No. 2,984,445. In this type, a coiled compression spring is mounted within a cylindrical housing which rests on a base plate. A first retainer is secured within the housing and engages the lower end of the spring while a second retainer engaging the upper end of the spring is coupled to a tension member to the base plate. The housing is held by the spring in an upright position but is pivotal about a fulcrum point at the lower edge of the housing, against the force of the spring. An elongated vertical member projects upwardly from the upper end of the housing and carries a cable support structure at its upper end. The vertical member is typically in the form of a rod or tube having an outside diameter much less than that of a housing member. There is a diameter reduction section between the upper end of the spring housing member and the lower end of the vertical post member.

Still another embodiment of the support post type is similar to that already described but has a fixed spring housing, the upper end of which provides a base for the pivotal action. The member resting thereon is connected through a diameter reduction section to the lower end of the post member and is coupled to the spring within the spring housing.

The latter two embodiments of the support post type have been quite satisfactory in use. They have an advantage in that, with proper design, the transverse force required to initiate tilting movement is of substantial magnitude and greater than the forces encountered except when parking maneuvers or the like. As a result, the possibility of oscillatory action is minimized. Unfortunately, these embodiments are relatively expensive. They also are subject to failure from fatigue.

SUMMARY OF THE INVENTION

This invention was evolved with the general object of improving upon the prior types of devices. More specifically, it provides devices which are simpler and more economical to manufacture while being superior in performance and with respect to reliability and safety.

In a device according to this invention, a post structure is provided including an elongated sleeve having an outside diameter which is uniform and a small fraction of the length thereof and having fulcrum means on one end thereof defining an annular edge which has a diameter substantially larger than the outside diameter of the sleeve. Spring means are located substantially entirely within the sleeve and hold the annular edge of the fulcrum means against the surface of a base member. When a transverse force is applied to an end portion of the sleeve, the spring means permits pivotal movement about a fulcrum point on the annular edge.

The fulcrum means is connected to one end of the sleeve through a diameter reduction section which can be economically manufactured and readily assembled on the end of the sleeve. Preferably, a base or foot member is provided including a large diameter cylindrical portion defining the annular fulcrum edge, a frustoconical intermediate portion and a small diameter cylindrical portion which is crimped on the end of the sleeve.

The spring is preferably a coiled helical spring and in one embodiment it is a tension spring while in others it is a compression spring. With the spring being located substantially entirely within the sleeve, it may be a long spring with many turns to allow the required deflection while also being very strong and reliable. The diameter of the spring may be uniform and only slightly less than the inside diameter of the sleeve, and the wire used in forming the spring may have a diameter which is large in comparison to the inside diameter of the sleeve.

It has been discovered that with either a tension spring or compression spring located substantially entirely within the sleeve, there is a possibility of a binding action between spring, sleeve and connection surfaces, which increases friction and stresses and the possibility of failure of the device during use especially with large angle tilting movements. In accordance with a specific feature, the connection between the base and the spring is elongated and is bendable at at least a plurality of points therealong to minimize the possibility of any binding action, even with large angle tilting movements. Preferably, a link is included having one end pivotally coupled to the base and an opposite end pivotally coupled to the spring, thereby providing an articulated connection.

With arrangements as above described, less material is required for housing the spring means, no separate spring housing member or section is required, the construction is thereby simpler and the device can be more economically manufactured. Also, the spring can be very strong and reliable even when the device is subjected to repeated large angle tilting movements. In addition, when a compression spring is employed, the lower end of the spring can be retained by the same structural geometry which is employed to secure the elongated sleeve to the diameter reduction section, as will be apparent from the detailed description of the drawings. At the same time, an annular fulcrum edge is provided which is relatively large to provide adequate stability and while at the same time minimizing the force requirements which are imposed on the spring means.

This invention contemplates other objects, features and advantages which will become more fully apparent from the following detailed description taken in conjunction with the accompanying drawings.

BRIEF DESCRIPTION OF THE DRAWINGS

FIG. 1 is an elevational view of a movable support post device constructed in accordance with the invention;

FIG. 2 is a sectional view of an intermediate portion of the device, taken substantially along line II—II of FIG. 1 and illustrating connecting means at the upper end of a spring;

FIG. 3 is a sectional view of a lower portion of the device of FIG. 1, taken substantially along line III—III of FIG. 1;

FIG. 4 is a sectional view similar to FIG. 2 but of an intermediate portion of a modified device;

FIG. 5 is a sectional view similar to FIG. 3 but illustrating a lower portion of the modified device of FIG. 4;

FIG. 6 is a sectional view of the intermediate portion of the modified device of FIGS. 4 and 5, taken substantially along line VI—VI of FIG. 4;

FIG. 7 is a sectional view of the lower portion of the modified device of FIGS. 4 and 5 taken substantially along line VII—VII of FIG. 5; and FIG. 8 is a sectional view similar to FIG. 7 but illustrating another modified device.

DESCRIPTION OF PREFERRED EMBODIMENTS

Referring to FIG. 1, reference numeral 10 generally designates a movable support post device constructed in accordance with the principles of this invention. The illustrated device 10 is particularly designed for installation on horizontal rear frame part 11 of a truck tractor. It includes a clamp device 12 for supporting portions of flexible hoses and cables which extend between the tractor and a trailer connected thereto. Such clamp devices are disclosed, for example, in Klimek and Mastis U.S. Pat. No. 4,024,604 and Dvorachek U.S. patent application Ser. No. 799,595, filed May 23, 1977, now U.S. Pat. No. 4,148,113. Support post device 10 may also include dummy coupler 13 for attaching non-functioning gladhands (not shown).

As previously set forth, the length of hoses and cables between the tractor and trailer must be large enough to allow the tractor to be at a sharp angle relative to the trailer, as when parking a trailer. The length is such that if the hoses and cable are not supported, they might sag and damage underlying components or become damaged therefrom or from each other. It is also desirable to minimize swaying movements of the hoses and cables. Durability and reliability are extremely important inasmuch as the hoses and cables are used to supply compressed air to the braking system of the trailer and to transmit electrical power and electrical signals between the tractor and the trailer.

In the illustrated construction, clamp 12 and dummy coupler 13 are mounted on an upper end or intermediate portions of an upright post structure. The structure comprises an elongated sleeve 14 having a cap 15 on the upper end thereof and having a foot member 16 on the lower end thereof. Foot member 16 has a lower annular edge 17 engaged with a base member 18 disposed on the tractor frame part 11. The post structure is normally held in an upright position as shown. It may, however, yieldably tilt in any direction about a fulcrum throughout 360° on the lower annular edge 17 in response to transverse forces of greater than a certain magnitude, applied to the upper end thereof. Such transverse forces may be applied by a hose or cable, which is clamped thereto, as the result of substantial movement of the tractor relative to the trailer.

Referring to FIGS. 2 and 3, to hold the post structure in an upright position while permitting yieldable movement thereof in response to transverse forces, spring means are provided including a coiled tension spring 20 which is disposed within the sleeve 14 with connection means being provided between the upper and lower ends of the spring 20 and the sleeve 14 and base member 18.

The upper end of the spring 20 is formed with a hook portion 21 which receives a shank portion 22 of a bolt 23 which is inserted through aligned openings in diametrically opposed wall portions of the sleeve 14, a nut 24 being threaded on the end of the shank portion 22.

The lower end of the spring 20 is also formed with a hook portion 26 which receives a hook portion 28 at the upper end of a link 29 which has a hook portion 30 at its lower end engaged in an opening 31 of an eye bolt 32 secured to the base member 18.

The link 29 performs a very important function in minimizing any binding action between spring, sleeve and connection surfaces and any concentrated stresses in portions of the spring. When the post structure is tilted, the connection arrangement can bend freely in any direction at the connection between the spring and link hook portions 26 and 28 and also at the connection between the hook portion 30 and eye bolt 32. When the post is tilted through a wide angle, the upper end of the link 29 and/or the lower end of the spring 20 may engage the inside surface of the sleeve 14 but with very little force so that friction is minimized.

The eye bolt 32 has a threaded shank portion 33 extending downwardly through an opening 35 in the base member 18 and thence through an opening 36 in the frame part 11. A jam nut 37 is disposed on the shank portion 33 to lock the eye bolt 32 to the base member 18 and a plane washer 38, a lock washer 39 and a nut 40 are disposed on the shank portion 33 below the frame part 11 to securely lock the device to the frame part 11.

The foot member 16 includes a lower large diameter cylindrical portion 42, the lower edge of which defines the annular edge 17 for engagement with the base member 18. The foot member 16 further includes an intermediate frustoconical portion 43 and an outer small diameter cylindrical portion 44. In assembly, the portion 44 is crimped onto the lower end of the sleeve member 14 and, as a result, an upwardly facing annular surface 45 is provided which is usable as a stop surface for a modified construction using a compression spring, described hereinafter. Also, a downwardly facing annular surface 46 is formed on the outside of the sleeve 14 engagable with the upper edge of the portion 44 of foot member 16 and, in addition, the lower terminal edge of the sleeve 14 is flared outwardly to provide an upwardly facing surface 47 which is engagable with the inside of the member 16 at the junction between portions 43 and 44.

The crimping operation provides a high degree of friction between the interengaged surfaces of member 16 and sleeve 14 and additional protection against relative movement is obtained through the formation of the surfaces 46 and 47. The foot member 16 is thereby securely locked to the lower end of the sleeve 14.

The base member 18 includes a horizontal wall portion 48, the periphery of which is joined to the upper end of a cylindrical wall portion 49. An annular flange 50 extends outwardly from the lower end of the cylindrical wall portion 49 to define a surface engaging the fulcrum edge portion 17 of the foot member 16. The cylindrical wall portion 49 fits inside the cylindrical portion 42 of the foot member 16 to provide a centering action.

In manufacturing the device, the foot member 16 is locked to the lower end of the sleeve 14 by crimping the portion 44 thereof on the sleeve 14 in the manner as above described, thereby forming a post sub-assembly. Then the spring assembly, including the spring 20, link 29 and eye bolt 32 may be inserted in the sleeve 14 from either end and the bolt 23 may be installed to engage the shank portion 22 thereof in the hook portion 21 of spring 20. The end of the shank portion 33 of the eye bolt 32 is inserted through the opening 35 in the base member 18 and the jam nut 37 is then threaded on the shank portion 33 and tightened to the position as illustrated. The cap 15 may then be installed to the upper end of the sleeve 14. Clamp 12 and dummy coupler 13 may then be installed or preferably may be supplied separately for installation when mounting the device on a tractor frame.

In the assembly of the device as above described, the spring 20 is tensioned to a certain extent. This exerts a certain force directed toward the point of engagement between the hook portion 30 of link 29 and the inner surface of the eye bolt opening 31. To tilt the device, a certain transverse force must be applied at an upper portion of the post structure. In general, the horizontal component of the applied force must approximately equal or exceed the force so applied by the spring 20 (plus any vertical component of the applied force) divided by the ratio of the vertical distance to the point at which the transverse force is applied to the radius of the fulcrum edge surface 17.

When the structure is tilted, the tension of the spring 20 is increased as a function of the angle of tilt. The spring 20 must be tensioned to an extent determined by the initial force to be applied and the allowable angle of tilt of the structure.

The location of the spring means within the sleeve 14 has important advantages in that no separate spring housing member or section is required and the construction and assembly are simplified. The spring 20 can be quite long with many turns to obtain the required deflection without undue stress and to obtain high strength and reliability, the diameter of the wire from which the spring is formed is relatively large in comparison to the inside diameter of the sleeve 14 and the outside diameter of the spring 20 is only slightly less than the inside diameter of the sleeve.

By way of example and not limitation, the overall height of the device, from the lower surface of the flange 50 of the base member 18 to the upper end of the top end cap 15, may be approximately 40 inches with all other dimensions being in the same proportions thereto as shown in the drawings. Thus, sleeve member 14 may have an outer diameter of about 1.125 inch and an inner diameter of about 1.0 inch, except for the crimped portion at the lower end where the inner diameter is reduced to about 0.95 inch. The cylindrical wall portion 49 has an outer diameter of about 2.15 inches and annular flange 50 has an outer diameter of about 2.37 inches, thus defining an annular surface for engaging the fulcrum edge portion 17 of the foot member 16. The inner diameter of cylindrical portion 42 is substantially the same, except for mechanical clearance, as the outer diameter of flange 50 so as to achieve the desired centering action.

The spring 20 may be formed of wire having a diameter of about 0.192 inch and may have an outside diameter of about 0.802 inch with 75 turns or convolutions and an initial length, in an unstressed condition, of about 17.50 inches as measured from the distance between the surfaces of the hook portions 21 and 26 which are engaged with the shank portion 22 and hook portion 28. The material used may be oil tempered ASTM A229 Class II. The dimensions of the link 29 and other associated components may be in the proportions as illustrated and may be such that the spring is elongated about 1 inch in assembly, to a length of about 18.5 inches.

Under such conditions, the force exerted by the spring in the normal condition may be on the order of 150 pounds and the transverse (horizontal) force required to be applied adjacent to the upper end portion of the device to initiate a tilting movement may be on the order of from about 3 to about 5 pounds, e.g., about 4 pounds. The initial tilting force can be readily adjusted, as desired, by adjusting the spring force. This can be readily accomplished by any one of several mechanical changes, e.g., changing dimensions of link 29, changing the length or characteristics of spring 20, etc.

FIGS. 4–7 illustrate a modified construction which includes the sleeve 14, the foot member 16 and the base member 18 constructed, assembled and cooperating in the same manner as described previously, but in which a coiled compression spring 52 is disposed within the sleeve 14. The lower end of the spring 52 is engaged with a retainer in the form of a washer 53. The upper end of the spring is engaged by a retainer in the form of a key 54 which is coupled to the base member 18 through a tension member in the form of a rod 56. The key 54 is formed to provide downwardly facing shoulder surfaces 57 and 58 engaging the spring 52 at diametrically opposite points. It has a central portion 59 extending downwardly within the spring 52. An opening 60 is provided in the portion 59 of the key 54 to receive a transversely projecting portion 61 at the upper end of the rod 56.

The lower end of the rod 56 is formed to provide a hook 62 which engages in an opening 63 of an eye bolt 64. The eye bolt 64 is similar to the eye bolt 32 and has a threaded shank portion 65 extending downwardly through the opening 35 in the base member 18 and thence through the opening 36 in the frame part 11. The jam nut 37 is disposed on the shank portion 65 to lock the eye bolt 64 to the base member 18 and the plane washer 38, lock washer 39 and nut 40 are disposed on the shank portion 65 below the frame part 11 to securely lock the device to the frame part 11.

As aforementioned, the crimping action used in securing the foot member 16 to the sleeve 14 provides the additional function of forming an annular retainer surface 45 and in the modified construction of FIGS. 4–7, the washer 53 for the compression spring 52 is seated thereagainst, thereby substantially reducing costs as compared with prior-art structures.

In manufacturing the modified device of FIGS. 4–7, the foot member 16 is locked to the lower end of the sleeve 14 by crimping the portion 44 thereof on the sleeve 14 in the manner as above described, thereby forming a post subassembly. Then the washer 53 and the remainder of the spring assembly, including the spring 52, key 54, rod 56 and eye bolt 64 may be dropped down through the sleeve 14 from the upper end. The end of the shank portion 65 of the eye bolt 64 is inserted through the opening 35 in the base member 18 and the jam nut 37 is then threaded on the shank portion 33 and tightened to the position as illustrated. The cap 15 may then be installed to the upper end of the sleeve 14. Clamp 12 and dummy coupler 13 may then be installed or preferably may be supplied separately for installation when mounting the device on a tractor frame.

In the assembly of the modified device of FIGS. 4–7 as above described, the spring 52 is compressed to a certain extent. This exerts a certain force directed toward the point of engagement between the hook portion 62 of rod 56 and the inner surface of the eye bolt opening 63. To tilt the device, a certain transverse force must be applied at an upper portion of the post structure. In general, the horizontal component of the applied force must approximately equal or exceed the force so applied by the spring 52 (plus any vertical component of the applied force) divided by the ratio of the vertical distance to the point at which the transverse force is applied to the radius of the fulcrum edge surface 17.

When the structure is tilted, the compression of the spring 52 is increased as a function of the angle of tilt. The spring 52 must be compressible to an extent determined by the initial force to be applied and the allowable angle of tilt of the structure.

The location of the compression spring 52 within the sleeve 14 has the same advantages as mentioned before including the fact that no separate spring housing member or section is required and the construction and assembly are simplified. Another advantage is that the dimensions of the spring are such that it can be broken at any point without preventing the spring from remaining effective. Thus, with the diameter of the wire from which the spring 52 is formed being relatively large in comparision to the inside diameter of the sleeve 14 and with the outside diameter of the spring 52 being only slightly less than the inside diameter of the sleeve, breakage of the spring 52 will result in seating of the convolution above the break against the convolution below the break and the spring can remain effective.

In addition, with the spring 52 having a large number of turns or convolutions and with a close spacing between adjacent convolutions, breakage at any point produces an insignificant effect on the operation of the device.

By way of example and not limitation, dimensions like those previously described may be used for corresponding parts in the modified construction of FIGS. 4–7. The overall height of the device, from the lower surface of the flange 50 of the base member 18 to the upper end of the top end cap 15, may be approximately 40 inches with all other dimensions being in the same proportions thereto as shown in the drawings. Thus, sleeve member 14 may have an outer diameter of about 1.125 inch and an inner diameter of about 1.0 inch, except for the crimped portion at the lower end where the inner diameter is reduced to about 0.95 inch. Retainer washer 53 may have an outer diameter substantially the same, except for sliding clearance, as the inner diameter of the uncrimped portion of sleeve member 14, i.e., about 1.0 inch, so as to be retained by annular stop surface 45. The cylindrical wall portion 49 has an outer diameter of about 2.15 inches and annular flange 50 has an outer diameter of about 2.37 inches, thus defining an annular surface for engaging the fulcrum edge portion 17 of the foot member 16. The inner diameter of cylindrical portion 42 is substantially the same, except for mechanical clearance, as the outer diameter of flange 50 so as to achieve the desired centering action.

The spring 52 may be formed of wire having a diameter of about 0.207 inch and may have an outside diameter of about 0.95 inch with 56 turns or convolutions and with squared ends and an initial length, in an unstressed condition, of about 15.50 inches. The material used may be oil tempered ASTM Class II or high tensile hard drawn ASTM A679. The dimensions of the tension rod and other associated components may be such that the spring is compressed about 2 inches in assembly, to a length of about 13.5 inches.

Under such conditions, the force exerted by the spring 52 in the normal condition may be on the order of 150 pounds and the transverse (horizontal) force required to be applied adjacent to the upper end portion of the device to initiate a tilting movement may be on the order of from about 3 to about 5 pounds, e.g., about 4 pounds. The initial tilting force can be readily adjusted, as desired, by adjusting the spring force. This can be readily accomplished by any one of several mechanical changes, e.g., changing dimensions of tension rod 56, changing the length or characteristics of spring 52, changing the thickness of washer 53 or using a spacer, etc. If the spring should break at any point, the force exerted by the spring in the normal condition or at any given angle of tilt will be reduced only slightly, the distance between convolutions being only a small fraction of the operative displacement of the spring.

FIG. 8 illustrates another modified construction which is similar to the modified construction of FIGS. 4–7, using the sleeve 14, the foot member 16 and the base member 18 constructed, assembled and cooperating in the same manner as described in connection with FIGS. 1–3 and also using the coiled compression spring 52, washer 53, key 54 and eye bolt 64 of the modified construction of FIGS. 4–7.

In the modified construction of FIG. 8, however, a tension rod 66 is provided of shorter length than the tension rod 56, having a lower end formed to provide a hook portion 67 which receives a hook portion 68 at the upper end of a link 69 which has a hook portion 70 at its lower end engaged in the opening 63 of the eye bolt 64.

The link 69 performs a very important function similar to that of the link 29 in the construction of FIGS. 1–3, in minimizing binding action and stresses, particularly at severe angles of tilt.

It will be understood that modifications and variations may be effected without departing from the spirit and scope of the novel concepts of this invention.

In the light of such description, what is claimed is:

1. A movable post device for supporting portions of flexible hose or cable members or the like, comprising: an elongated hollow sleeve having an outside diameter which is substantially uniform and a small fraction of the length thereof, fulcrum means on one end of said sleeve defining an annular fulcrum edge having a diameter substantially larger than said outside diameter of said sleeve, means adjacent the other end of said sleeve for support of a flexible member to be supported, base means having an annular portion engageable by said annular fulcrum edge, an elongated coiled spring for acting between said base means and said sleeve to urge said annular edge into engagement with an annular portion of said base means and to hold said sleeve in a normal position while allowing pivotal movement of said sleeve about a fulcrum point on said annular fulcrum edge in response to application of a transverse force of a certain magnitude at said other end of said sleeve, first connection means between said spring means and said base means, and second connection means between said spring means and said sleeve, said spring being located substantially entirely within said sleeve and having a large number of convolutions and a diameter only slightly less than the inside diameter of said sleeve and being formed of a wire having a diameter which is relatively large in comparison to the inside diameter of said sleeve, said first connection means comprising a link, a first connection between one end of said link and said base means, and a second connection between the opposite end of said link and said spring, said link being effective to minimize transverse displacement of said second connection and to minimize pressure engagement between convolutions of said spring and the internal surface of said sleeve.

2. In a device as defined in claim 1, said spring being a compression spring having a first end adjacent said one end of said sleeve and a second end between said first end thereof and said other end of said sleeve, with said second end thereof being coupled to said first connection means and with said first end thereof being coupled to said second connection means.

3. In a device as defined in claim 2, said first connection means comprising an elongated tension member within said compression spring, retaining means acting between said second end of said spring and one end of said tension member, and coupling means between the opposite end of said elongated tension member and said base means, and said second connection means comprising retaining means acting between said first end of said spring and said sleeve to limit movement of said first end of said spring toward said base means.

4. In a device as defined in claim 3, said coupling means comprising a link extending from one end pivotally coupled to said base means to an opposite end pivotally coupled to said opposite end of said elongated tension member.

5. In a device as defined in claim 2, said spring having a diameter only slightly less than the inside diameter of said sleeve and being formed of wire having a diameter which is relatively large in comparison to the inside diameter of said sleeve, such that with breakage of said spring at any point adjacent convolutions thereof will seat against each other for continued operation of said spring.

6. In a device as defined in claim 2, said spring having a large number of convolutions with the spacing between adjacent convolutions being a small fraction of the operative displacement of said spring.

7. In a device as defined in claim 1, said fulcrum means comprising a foot member including a first cylindrical portion having an edge defining said annular fulcrum edge, a second cylindrical portion of substantially smaller diameter than said first cylindrical portion and an intermediate frustoconical portion interconnecting said first and second cylindrical portions, said second cylindrical portion being secured to said one end of said sleeve.

8. In a device as defined in claim 7, said second cylindrical portion being crimped on said one end of said sleeve with a portion of said one end of said sleeve being distorted to define an annular shoulder facing toward said other end of said sleeve, and a spring retainer washer seated against said shoulder.

9. In a device as defined in claim 7, said foot member having a short axial length equal to a small fraction of the length of said sleeve to position said one end of said sleeve within a short distance from said annular fulcrum edge, said first connection being between said annular portion of said base means and said one end of said sleeve in said normal position of said sleeve.

10. In a device as defined in claim 1, said one end of said sleeve being positioned within a short distance from said annular portion of said base means when said sleeve is in said normal position thereof, said first connection being located between said annular portion of said base means and said one end of said sleeve in said normal position of said sleeve, and said link between said first and second connections being relatively narrow with a transverse dimension equal to a small fraction of the inside dimension of said sleeve to minimize engagement with the inside surface of said sleeve during tilting movement thereof.

11. In a device as defined in claim 1, said first connection being a hook-and-eye type connection providing interengaging surfaces for pivotal movement of said link relative to said base means in a direction corresponding to pivotal movement of said sleeve about any fulcrum point on said annular fulcrum edge.

12. In a device as defined in claim 11, said link being formed of an elongated metal member of circular cross-section having a diameter substantially greater than the diameter of the metal from which said coiled spring is formed to provide increased strength and to provide an increased area of the surface thereof engaged with that of said base means.

13. In a device as defined in claim 11, said interengaging surfaces being located within a short distance from the plane of said annular portion of said base means and being in adjacent relation to said one end of said sleeve when said sleeve is in said normal position thereof.

14. In a device as defined in claim 11, said spring being a tension spring and said second connection being between said opposite end of said link and the one end of said spring located closest to one end of said sleeve.

15. In a device as defined in claim 1, said spring being a tension spring having an end formed as a hook, and said second connection means comprising a cross-pin through said hook and opposite wall portions of said sleeve.

* * * * *